US010506620B2

(12) United States Patent
Urabayashi et al.

(10) Patent No.: US 10,506,620 B2
(45) Date of Patent: Dec. 10, 2019

(54) COMMUNICATION DEVICE

(71) Applicant: KYOCERA CORPORATION, Kyoto (JP)

(72) Inventors: Hiroyuki Urabayashi, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/988,169

(22) Filed: May 24, 2018

(65) Prior Publication Data

US 2018/0270845 A1    Sep. 20, 2018

Related U.S. Application Data

(63) Continuation of application No. PCT/JP2016/084778, filed on Nov. 24, 2016.

(30) Foreign Application Priority Data

Nov. 26, 2015    (JP) .................................. 2015-230537

(51) Int. Cl.
H04W 72/12    (2009.01)
H04W 74/06    (2009.01)
H04W 84/12    (2009.01)

(52) U.S. Cl.
CPC ..... H04W 72/121 (2013.01); H04W 72/1289 (2013.01); H04W 74/06 (2013.01); H04W 72/1273 (2013.01); H04W 84/12 (2013.01)

(58) Field of Classification Search
CPC ........... H04W 72/121; H04W 72/1289; H04W 84/12; H04W 72/1273; H04W 74/06

(Continued)

(56) References Cited

U.S. PATENT DOCUMENTS

2013/0286959 A1    10/2013 Lou et al.
2013/0301551 A1    11/2013 Ghosh et al.
(Continued)

FOREIGN PATENT DOCUMENTS

JP    2015-520973 A    7/2015
JP    2015-522974 A    8/2015
WO    2015/133648 A1    9/2015

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; IEEE Specifications "IEEE Std 802.11™-2012" Mar. 29, 2012; pp. 1-2695; NY, USA.

*Primary Examiner* — Faisal Choudhury
(74) *Attorney, Agent, or Firm* — Studebaker & Brackett PC

(57) ABSTRACT

A communication device according to embodiment comprises a transmitter configured to transmit first information to a plurality of other communication devices, via a communication scheme in which communication is performed without synchronization between devices; and a receiver configured to receive second information as a response to reception of the first information from the plurality of other communication devices via the communication scheme. The transmitter is configured to transmit, to each communication device of the plurality of other communication devices, transmission timing information for each communication device of the plurality of other communication devices to designate a transmission timing of the second information.

13 Claims, 11 Drawing Sheets

(58) Field of Classification Search
USPC .......................................................... 370/336
See application file for complete search history.

(56) References Cited

U.S. PATENT DOCUMENTS

| | | | |
|---|---|---|---|
| 2014/0126550 A1* | 5/2014 | Frederiks | H04W 74/085 370/336 |
| 2015/0382374 A1* | 12/2015 | Bhorkar | H04W 24/00 370/330 |
| 2016/0056935 A1* | 2/2016 | Damnjanovic | H04L 5/0048 370/252 |
| 2016/0373559 A1* | 12/2016 | Nabetani | H04L 1/16 |
| 2017/0238272 A1* | 8/2017 | You | H04J 11/0073 370/350 |

* cited by examiner

COMMUNICATION DEVICE

CROSS-REFERENCE TO RELATED APPLICATION

The present application is a continuation based on PCT Application No. PCT/JP2016/084778 filed on Nov. 24, 2016, which claims the benefit of Japanese Patent Application No. 2015-230537 (filed on Nov. 26, 2015). The content of which is incorporated by reference herein in their entirety.

FIELD

The present application relates to a communication device used in a communication system.

BACKGROUND

In recent years, accompanying a rapid increase in traffic, communication devices performing communication via a wireless LAN (Wireless Local Area Network (WLAN)) communication scheme are increasing. The WLAN communication scheme is, for example, a communication scheme based on IEEE 802.11 specifications and is a communication scheme in which communication is performed without synchronization between the devices.

For example, a first communication device (for example, a network-side node) transmits first information (for example, user data) to a non-synchronized second communication device (for example, a radio terminal) via the WLAN communication scheme. After normally receiving the data, the second communication device transmits, after a shortest wait time (SIFS (Short InterFrame Space) time) has elapsed, second information (for example, an ACK) to the first communication device, in response to the reception of the data.

It is assumed that an existing WLAN communication scheme is used when performing a communication of one-to-one. Therefore, it is not assumed that the first communication device receives the second information from a plurality of second communication devices.

PRIOR ART DOCUMENT

Non-Patent Document

Non-Patent Document 1; IEEE Specifications "IEEE Std 802.11™-2012" Mar. 29, 2012.

SUMMARY

A communication device according to one embodiment uses a communication scheme in which communication is performed without synchronization between devices. The communication device comprises a transmitter configured to transmit first information to a plurality of other communication devices, via the communication; and a receiver configured to receive second information as a response to reception of the first information from the plurality of other communication devices via the communication scheme. The transmitter is configured to transmit, to each communication device of the plurality of other communication devices, transmission timing information for each communication device of the plurality of other communication devices to designate a transmission timing of the second information.

A communication device according to one embodiment comprises a receiver configured to receive first information from another communication device, via a communication scheme in which communication is performed without synchronization between devices; and a transmitter configured to transmit, in response to reception of the first information, second information to the other communication device, via the communication scheme. The receiver is configured to receive, from the other communication device, transmission timing information for designating a transmission timing of the second information.

A communication device according to one embodiment comprises a controller configured to classify a plurality of other communication devices being a reception target for receiving first information via a communication scheme in which communication is performed without synchronization between devices, into a plurality of groups; a transmitter configured to simultaneously transmit the first information to each of the other communication devices constituting a same group among the plurality of other communication devices, via the communication scheme; and a receiver configured to receive second information as a response to reception of the first information from each of the other communication devices, via the communication scheme. The controller is configured to classify the plurality of other communication devices into a plurality of groups, based on a propagation delay between the communication device and each of the plurality of other communication devices.

DESCRIPTION OF EMBODIMENTS

Overview of Embodiments

Figure 1:
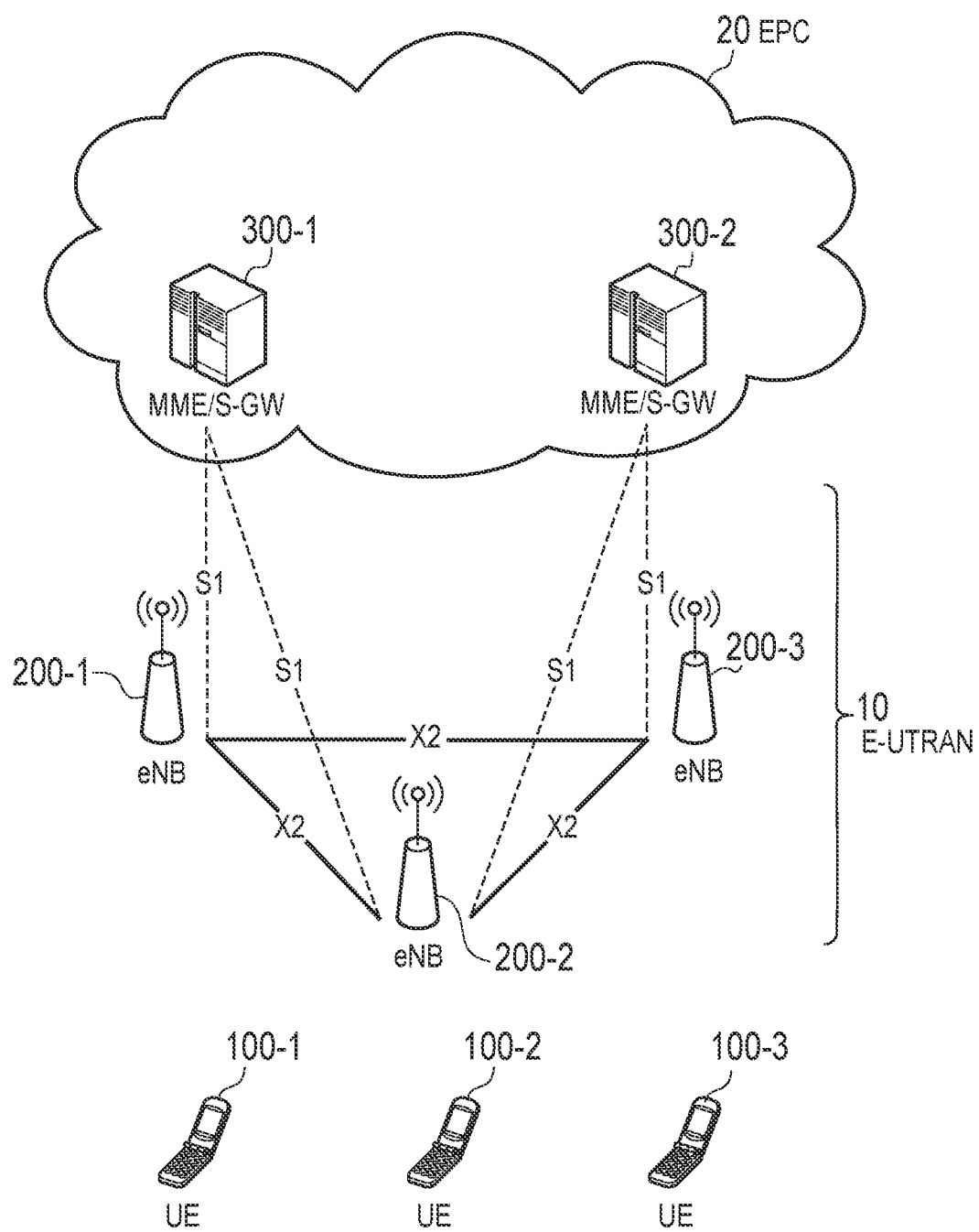
FIG. 1 is a diagram illustrating a configuration of an LTE system.

A communication device according to a first embodiment uses a communication scheme in which communication is performed without synchronization between devices. The communication device comprises a transmitter configured to transmit first information to a plurality of other communication devices, via the communication; and a receiver configured to receive second information as a response to reception of the first information from the plurality of other communication devices via the communication scheme. The transmitter is configured to transmit, to each communication device of the plurality of other communication devices, transmission timing information for each communication device of the plurality of other communication devices to designate a transmission timing of the second information.

The transmitter may transmit, as the transmission timing information, dedicated information in accordance with a propagation delay between the communication device and each communication device of the plurality of other communication devices, to each communication device of the plurality of other communication devices.

The dedicated information may be at least one of information indicating a transmission start timing of the second information and a wait time from a reception completion of the first information to a transmission start of the second information.

The transmitter may transmit, as the transmission timing information, to each communication device of the plurality of other communication devices, common information for the plurality of other communication devices to designate a reception timing of the second information in the communication device.

The common information may be at least one of information indicating a reception start timing of the second information and information indicating a time from a transmission completion of the first information to a reception start of the second information.

The communication device may further comprise a controller configured to shorten a time length of the first information more than a predetermined value indicating a transmission interval. The controller may shorten the time length of the first information more than the predetermined value, based on a shortest wait time from a reception of the first information to a transmission of the second information by the plurality of other communication devices.

The communication device may further comprise a controller configured to shorten a time length of the first information more than a predetermined value indicating a transmission interval. The controller may shorten the time length of the first information more than the predetermined value, based on information in accordance with a propagation delay between the communication device and each communication device of the plurality of other communication devices.

The transmitter may transmit, as the transmission timing information, information for designating a time length of the first information shorter than the predetermined value, to each communication device of the plurality of other communication devices.

A communication device according to the first embodiment comprises a receiver configured to receive first information from another communication device, via a communication scheme in which communication is performed without synchronization between devices; and a transmitter configured to transmit, in response to reception of the first information, second information to the other communication device, via the communication scheme. The receiver is configured to receive, from the other communication device, transmission timing information for designating a transmission timing of the second information.

The transmission timing information may be at least one of: information indicating a transmission start timing of the second information and a wait time from a reception completion of the first information to a transmission start of the second information.

The receiver may receive, as the transmission timing information, information for designating a reception timing of the second information in the other communication device, from the other communication device. The communication device may further comprise a controller configured to designate a transmission timing of the second information, based on information in accordance with a propagation delay between the communication device and the other communication device and the transmission timing information.

The information for designating the reception timing of the second information may be at least one of information indicating a reception start timing of the second information in the other communication device and information indicating a time from a transmission completion of first information to a reception start of the second information in the other communication device.

The receiver may receive, as the transmission timing information, information for designating a time length of the first information that is shorter than a predetermined value indicating a transmission interval. The communication device may further comprise a controller configured to designate a transmission timing of the second information, based on information in accordance with a propagation delay between the communication device and the other communication device and the transmission timing information.

A communication device according to a second embodiment comprises a controller configured to classify a plurality of other communication devices being a reception target for receiving first information via a communication scheme in which communication is performed without synchronization between devices, into a plurality of groups; a transmitter configured to simultaneously transmit the first information to each of the other communication devices constituting a same group among the plurality of other communication devices, via the communication scheme; and a receiver configured to receive second information as a response to reception of the first information from each of the other communication devices, via the communication scheme. The controller is configured to classify the plurality of other communication devices into a plurality of groups, based on a propagation delay between the communication device and each of the plurality of other communication devices.

The controller may classify, among the plurality of other communication devices, each of the other communication devices having the propagation delay included in a predetermined range, into a same group.

First Embodiment (System Configuration)

Hereafter, an LTE (Long-Term Evolution) system which is a mobile communication system according to the embodiment will be described. FIG. 1 is a diagram showing a configuration of an LTE system.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device. The UE 100 performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells. The eNB 200 performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area. It is noted that the "cell" is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

(LAA)

An LTE system according to the embodiment uses for communication not only a licensed band for which the license is granted to operators, but also an unlicensed band for which the license is not required. Specifically, with an aid of the licensed band, it is possible to access the unlicensed band. Such mechanism is referred to as Licensed-Assisted Access (LAA).

Figure 2:
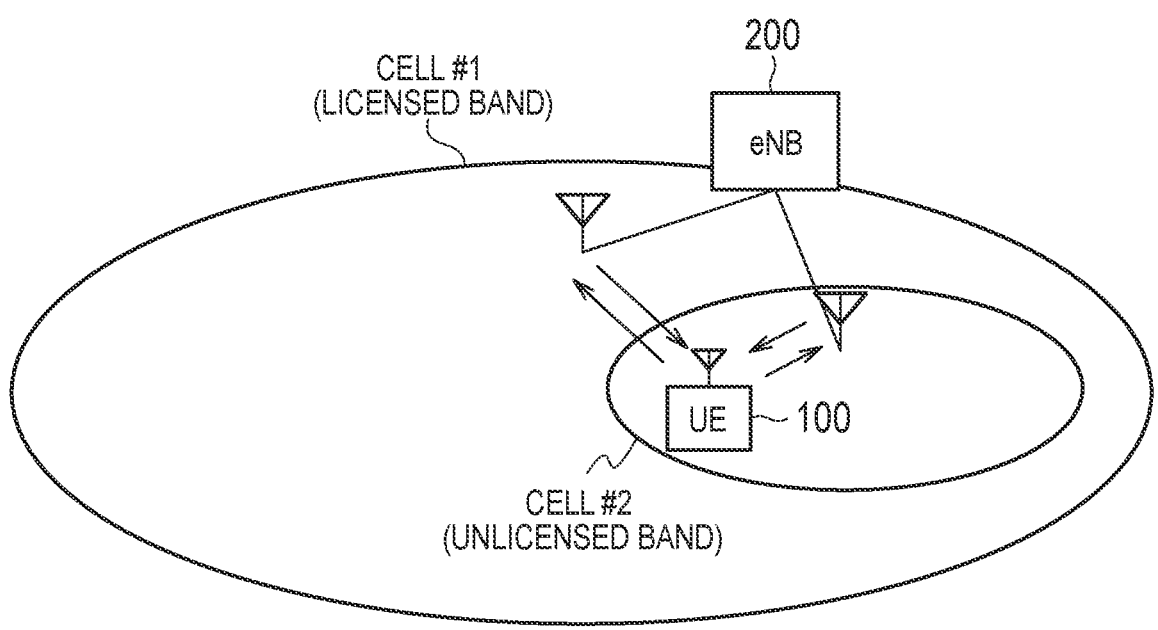
FIG. 2 is a diagram for describing an LAA.

FIG. 2 is a diagram for describing the LAA. As illustrated in FIG. 2, the eNB 200 manages a cell #1 operated in a licensed band and a cell #2 operated in an unlicensed band. In FIG. 2, an example is illustrated where the cell #1 is a macro cell and the cell #2 is a small cell, but a cell size is not limited to this.

In the unlicensed band, in order to avoid interference with a system (such as wireless LAN) different from the LTE system or an LTE system of another operator, a Listen-Before-Talk (LBT) procedure is required. The LBT procedure is a procedure in which it is confirmed, based on received power, whether or not a frequency channel is available, and only if it is confirmed that the frequency channel is a clear channel, the frequency channel is used.

By the LBT procedure, the eNB 200 seeks a clear channel in the cell #2 (unlicensed band), and uses the clear channel to perform communication with the UE 100. Specifically, the eNB 200 performs communication with the UE 100 by using a WLAN communication scheme in which communication is performed without synchronization between devices (between the eNB and the UE).

Figure 3:
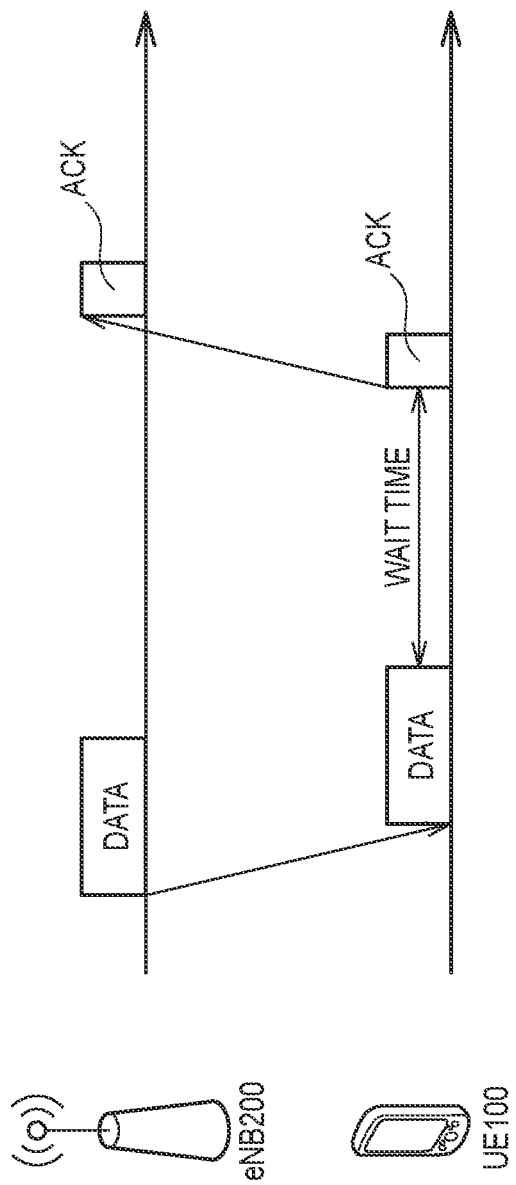
FIG. 3 is a diagram for describing a WLAN communication scheme.

FIG. 3 is a diagram for describing the WLAN communication scheme. As illustrated in FIG. 3, the eNB 200 uses the clear channel to transmit data to the UE 100 via the WLAN communication scheme. The UE 100 receives the data from the eNB 200. The UE 100 transmits, to the eNB 200, an acknowledgment (ACK) in response to the reception of the data, without executing the LBT procedure. Specifically, the UE 100 starts transmission of the acknowledgment after a predetermined time (Wait Time) has elapsed.

The predetermined time is equal to or longer than a shortest wait time (SIFS (Short InterFrame Space) time) and shorter than a time during which transmission is not possible due to a disturbance by another communication device (DIFS (Distributed (coordination function) InterFrame Space) time). The predetermined time may be the same as the SIFS time. The SIFS time is the shortest wait time in a frame transmission interval. Specifically, the SIFS time is a nominal time required for a MAC and a PHY for receiving a last symbol of a frame on an air interface, processing the frame, and responding in a first symbol of the earliest possible response frame on the air interface. It is noted that the DIFS time is a time until a radio signal cannot be detected any more from a frequency channel being used, and it is determined that the channel is in an idle state (a clear channel not being used).

(Radio Terminal)

Figure 4:
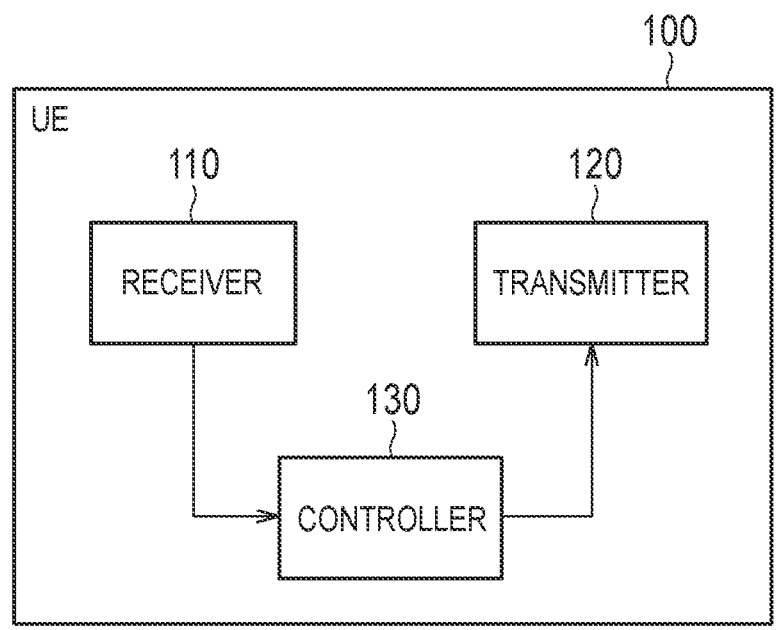
FIG. 4 is a block diagram of a UE 100.

A UE 100 (radio terminal) according to the embodiment will be described below. FIG. 4 is a block diagram of the UE 100. As illustrated in FIG. 4, the UE 100 includes a receiver 110, a transmitter 120, and a controller 130. The receiver 110 and the transmitter 120 may be unified as one in the form of a transceiver. Further, the receiver 110 may be constituted by a receiver using a cellular communication (LTE communication) scheme and a receiver using the WLAN communication scheme. Similarly, the transmitter 120 may be constituted by a transmitter used in the cellular communication scheme and a transmitter using the WLAN communication scheme.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 120 transmits the radio signal by the antenna.

The controller 130 performs various types of controls in the UE 100. The controller 130 includes a processor and a memory. The memory stores a program to be executed by the processor, and information to be used for a process by the processor. The processor may include a baseband processor and a CPU (Central Processing Unit). The baseband processor performs modulation and demodulation, coding and decoding, and the like, of the baseband signal. The CPU executes a program stored in the memory to perform various types of processes. The processor may include a codec that performs coding and decoding on sound and video signals. The processor executes various types of processes described later, and various types of communication protocols described above.

The UE 100 may include a GNSS receiving equipment. The GNSS receiving equipment receives a GNSS signal to obtain location information indicating a geographical position of the UE 100. The GNSS receiving equipment outputs the received signal to the controller 130. Alternatively, the UE 100 may have a GPS function for acquiring the location information of the UE 100.

It is noted that a below-described process (operation) executed by the UE 100 is executed by at least any one of the receiver 110, the transmitter 120, and the controller 130 included in the UE 100; however, for simplicity, description is given assuming that the process is executed by the UE 100.

(Base Station)

Figure 5:
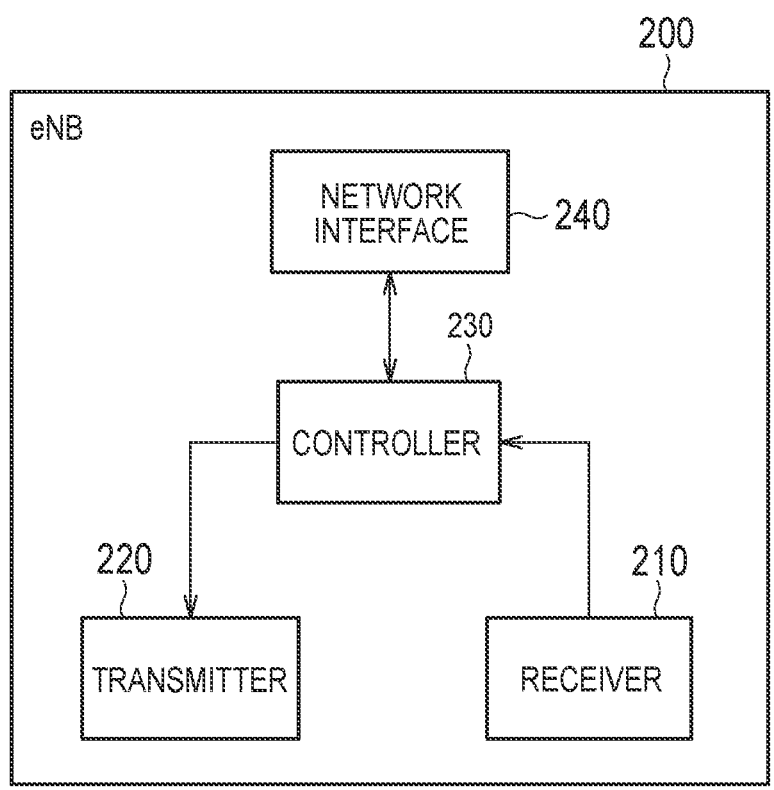
FIG. 5 is a block diagram of an eNB 200.

An eNB 200 (base station) according to the embodiment will be described below. FIG. 5 is a block diagram of the eNB 200. As illustrated in FIG. 5, the eNB 200 includes a receiver 210, a transmitter 220, a controller 230, and a network interface 240. The receiver 210 and the transmitter 220 may be unified as one in the form of a transceiver. The receiver 210 may be constituted by a receiver using the cellular communication (LTE communication) scheme and a receiver using the WLAN communication scheme. Similarly, the transmitter 220 may be constituted by a transmitter used in the cellular communication scheme and a transmitter used in the WLAN communication scheme.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor may include a baseband processor and a CPU (Central Processing Unit). The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME/S-GW 300 via the S1 interface. The network interface 240 is used in communication performed on the X2 interface, communication performed on the S1 interface, and the like.

It is noted that the below-described process (operation) executed by the eNB 200 is executed by at least any one of the transmitter 210, the receiver 220, the controller 230, and the network interface 240 included in the eNB 200; however, for simplicity, description is given assuming that the process is executed by the eNB 200.

(Operation According to First Embodiment)

Figure 6:
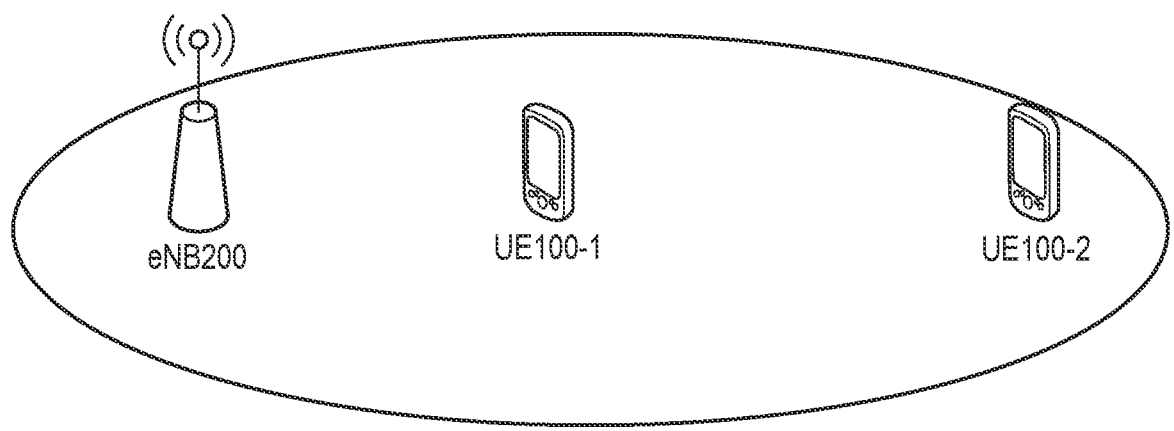
FIG. 6 is a diagram for describing an operation environment according to a first embodiment.
Figure 7:
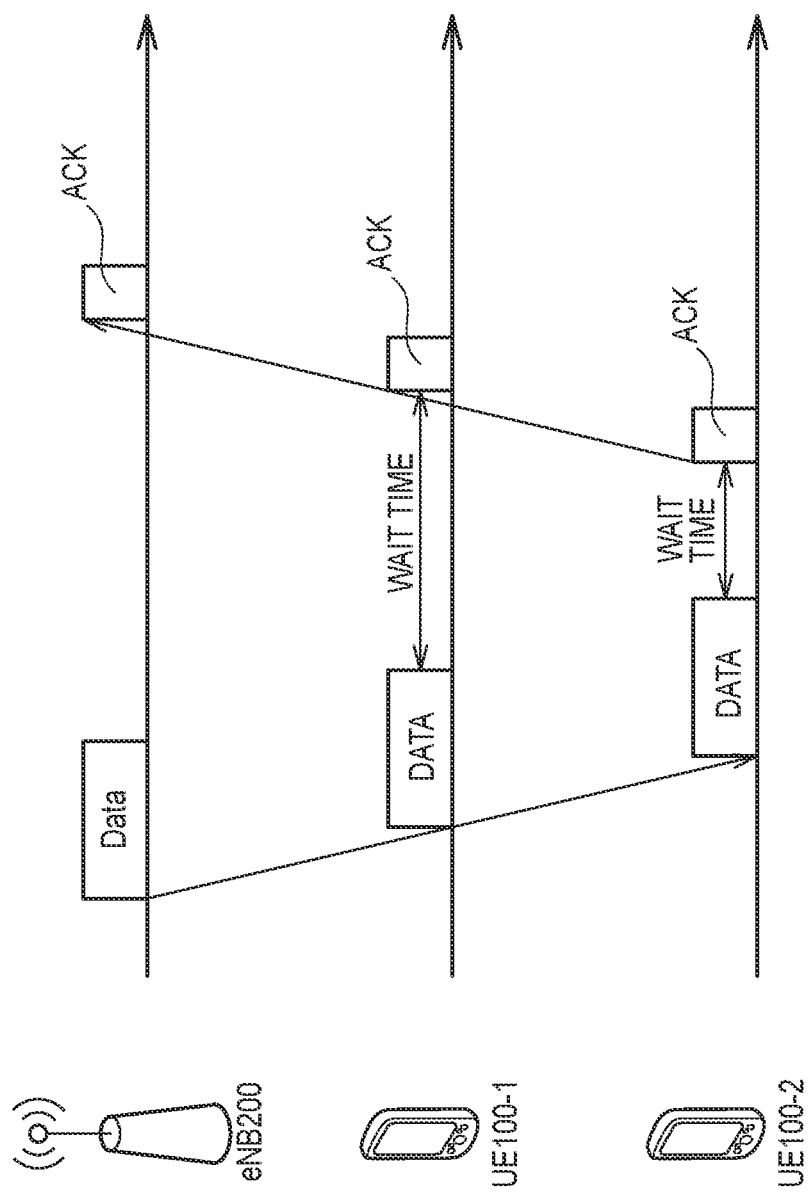
FIG. 7 is a diagram for describing an operation pattern (operation pattern 1) according to the first embodiment.
Figure 8:
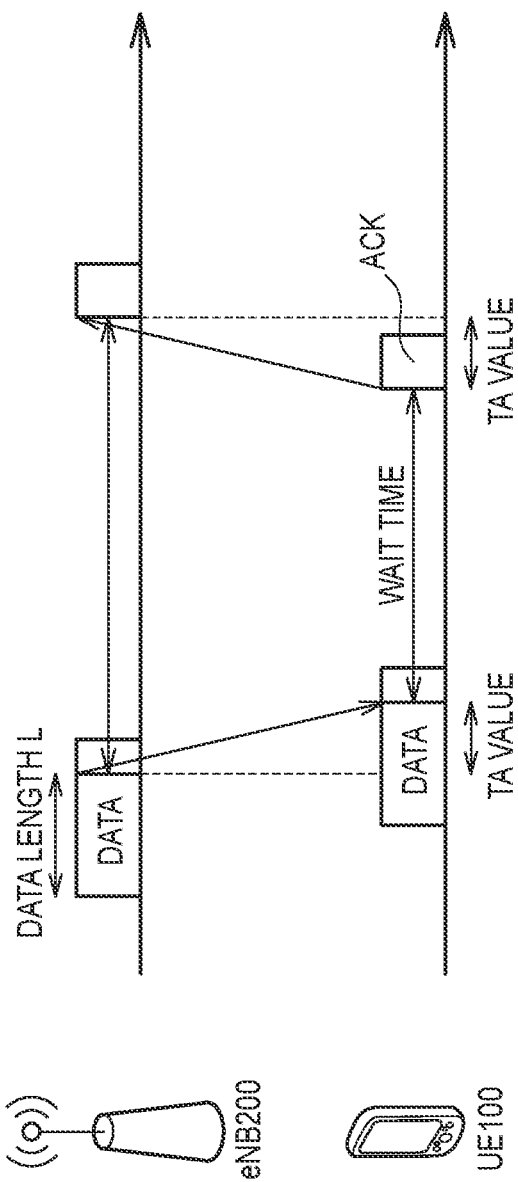
FIG. 8 is a diagram for describing an operation pattern (operation pattern 2) according to the first embodiment.
Figure 9:
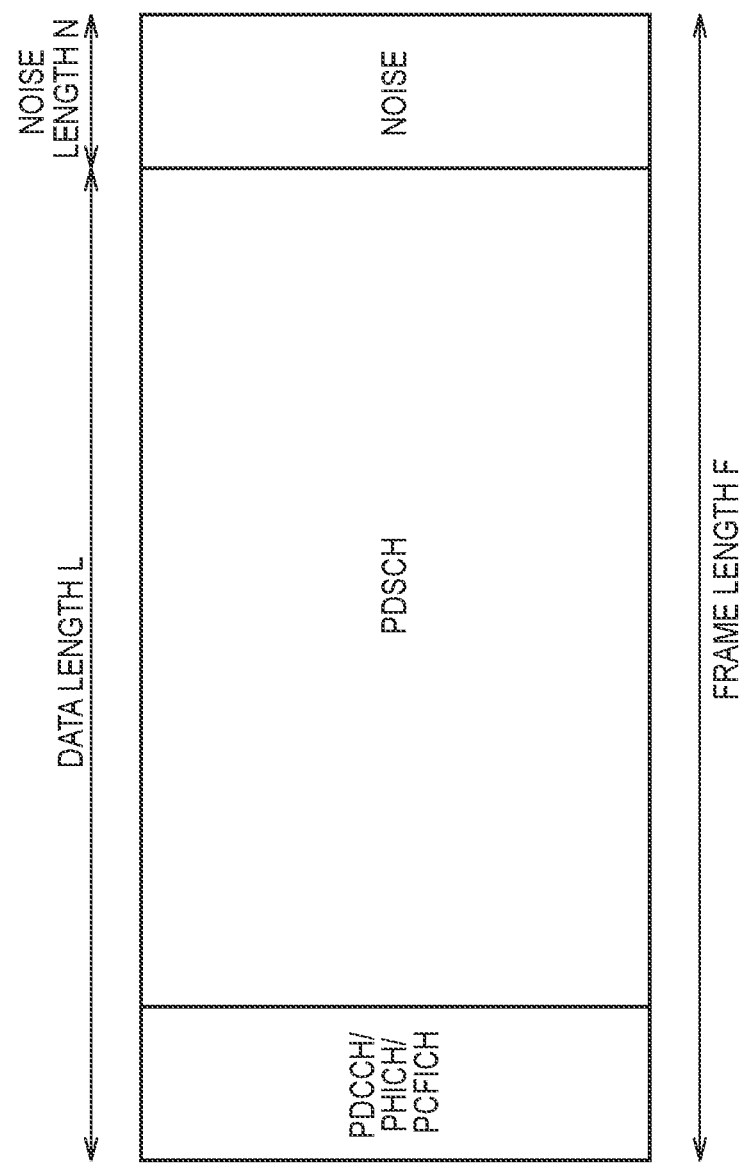
FIG. 9 is a diagram for describing an example of a transmission frame.
Figure 10:
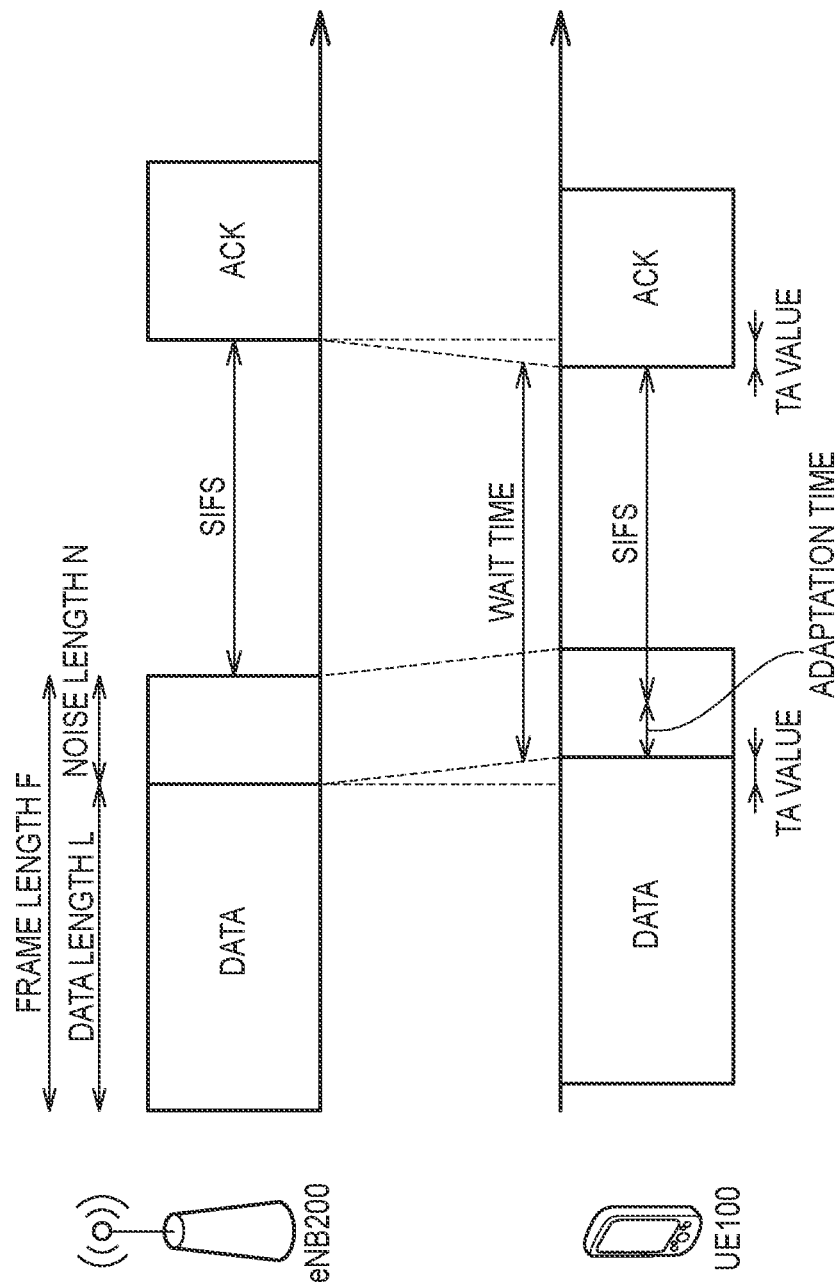
FIG. 10 is a diagram for describing an operation pattern (operation pattern 3) according to the first embodiment.

Next, an operation according to the first embodiment will be described with reference to FIG. 6 to FIG. 10. FIG. 6 is a diagram for describing an operation environment according to the first embodiment. FIG. 7 is a diagram for describing an operation pattern (operation pattern 1) according to the first embodiment. FIG. 8 is a diagram for describing an operation pattern (operation pattern 2) according to the first embodiment. FIG. 9 is a diagram for describing an example of a transmission frame. FIG. 10 is a diagram for describing an operation pattern (operation pattern 3) according to the first embodiment.

As illustrated in FIG. 6, each UE 100 (a UE 100-1 and a UE 100-2) is located within a cell managed by the eNB 200. Here, the cell is a cell operated in the unlicensed band. Therefore, each UE 100 is in a state in which the UE 100 can receive a radio signal from the eNB. The UE 100-1 is located close to the eNB 200; the UE 100-2 is located far from the eNB 200. Accordingly, description proceeds under the assumption that a propagation delay (time) between the UE 100-1 and the eNB 200 is smaller (shorter) than a propagation delay (time) between the UE 100-2 and the eNB 200.

In such an operation environment, a case is assumed in which the eNB 200 transmits first information (data) to a plurality of UEs 100 (the UE 100-1 and the UE 100-2), via the WLAN communication scheme.

Here, the WLAN communication scheme is a communication scheme in which communication is performed without synchronization between the eNB 200 and each UE 100.

Therefore, in the present embodiment, in order to receive second information as a response to the reception of the first information from a plurality of UEs 100 at the same timing or within the same radio resource in a time direction, the eNB 200 transmits, to the plurality of UEs 100, transmission timing information for each UE 100 of the plurality of UEs 100 to designate a transmission timing of the second information. A detailed operation will be described in operation pattern 1 to 5 below. It is noted that description of overlapping content in each operation pattern will be omitted where appropriate.

(A) Operation Pattern 1

In operation pattern 1, the eNB 200 transmits, as transmission timing information, information indicating a transmission start timing of the second information in each UE 100. That is, in operation pattern 1, the eNB 200 transmits, as the transmission timing information, dedicated information in accordance with the propagation delay, to each UE 100.

As illustrated in FIG. 7, the eNB 200 transmits the data (the first information) to each UE 100 of the plurality of UEs 100 via the WLAN communication scheme. That is, the eNB 200 uses a clear channel in the unlicensed band to transmit the data to each UE 100 of the plurality of UEs 100.

The UE 100-1 and the UE 100-2 receive the data from the eNB 200. Due to having a shorter propagation delay time than the UE 100-2, the UE 100-1 receives the data faster than the UE 100-2. The UE 100-2, on the other hand, receives the data later than the UE 100-1.

In response to the reception of the data, each UE 100 transmits delivery confirmation information (the second information) via the WLAN communication scheme. The UE 100 having succeeded in the reception of the data transmits an ACK (acknowledgment). The UE 100 having failed in the reception of the data transmits a NACK (negative acknowledgment). It is noted that each UE 100 may transmit a HARQ feedback (ACK/NACK) for a HARQ (Hybrid ARQ) process being a retransmission process. Description proceeds below under the assumption that each UE 100 transmits the ACK as the second information.

Before transmitting the second information, each UE 100 designates the transmission timing of the second information, based on the transmission timing information received from the eNB 200. In operation pattern 1, the transmission timing information is information indicating the transmission start timing of the second information. The eNB 200 can transmit, for example, as the transmission timing information, information indicating the transmission start timing of the second information, based on UTC (Coordinated Universal Time), to each UE 100. The information indicating the transmission start timing of the second information may be information indicating a radio resource used by each UE 100 for transmitting the second information (especially information for designating a time location (and a frequency location)).

The eNB 200 may include the transmission timing information in the data (the first information). Alternatively, the eNB 200 may transmit the transmission timing information separately from the data to the UE 100-1 and the UE 100-2. In this case, the eNB 200 may use a channel in the licensed band to transmit the transmission timing information. The eNB 200 may transmit the transmission timing information via dedicated signaling (for example, Downlink Control Information (DCI)).

In order to receive the second information transmitted from the UE 100-1 and the second information transmitted from the UE 100-2 at the same timing or within the same radio resource, the eNB 200 calculates the transmission timing of the second information in each UE 100, under consideration of the propagation delay (time) between the eNB 200 and each UE 100 of the plurality of UEs 100. That is, the eNB 200 calculates the transmission timing of the second information of each UE 100.

The eNB 200 may calculate the propagation delay time based on a difference between a time stamp indicating a transmission timing included in a radio signal received from the UE 100 via the WLAN communication scheme in the unlicensed band and a timing when the eNB 200 receives the radio signal. The eNB 200 may calculate the propagation delay time based on location information of the eNB 200 and location information of the UE 100. The eNB 200 may acquire the location information of the UE 100 from the UE 100. The eNB 200 may acquire the location information of the UE 100 from a network device managing the location of the UE 100. The eNB 200 may calculate the propagation delay time based on a TA (Timing Advanced) value used in an adjustment of a transmission timing in an uplink in the cellular communication (the LTE communication). The TA value is a value originating in an uplink reception timing. The TA value is used in LTE communication (cellular communication) in which communication is performed in a state of synchronization being established between devices. Specifically, in the cellular communication, the UE 100 uses the TA value for advancing/delaying an uplink transmission timing to the eNB 200.

The eNB 200 calculates an dedicated transmission timing of the second information for each UE 100, under consideration of the calculated propagation delay time. The eNB 200 may calculate the transmission timing of the second information from information used for calculating the above-mentioned propagation delay time, without calculating the propagation delay time.

Accordingly, the eNB 200 transmits information indicating the transmission start timing of the second information in the UE 100-1 in accordance with the propagation delay between the eNB 200 and the UE 100-1, as the transmission timing information, to the UE 100-1. The eNB 200 transmits information indicating the transmission start timing of the second information in the UE 100-2 in accordance with the propagation delay between the eNB 200 and the UE 100-2, as the transmission timing information, to the UE 100-2. It is noted that the transmission start timing of the UE 100-2 is earlier than the transmission start timing of the UE 100-1.

Each UE 100 having received the data (the first information) from the eNB 200 transmits the second information (ACK), based on the transmission timing information. Specifically, each UE 100 transmits the ACK at the transmission start timing of the second information indicated by the transmission timing information. Each UE 100 does not start transmission of the ACK until the transmission start timing of the second information, even if the shortest wait time (SIFS time) has elapsed since a reception completion timing of the data.

As illustrated in FIG. 7, the UE 100-2 starts transmission of the ACK before the UE 100-1. The UE 100-1 starts transmission of the ACK after the UE 100-2. Therefore, a wait time of the UE 100-1 (wait time from the reception completion of the data to the transmission start of the ACK) is longer than a wait time of the UE 100-2.

On the other hand, the eNB 200 receives the ACKs from each of the UE 100-1 and the UE 100-2 at the same timing or within the same radio resource in the time direction.

(B) Operation Pattern 2

In operation pattern 2, the eNB 200 transmits, as the transmission timing information, information indicating a wait time from the reception completion of the first information (the data) to the transmission start of the second information. That is, in operation pattern 2, similarly to operation pattern 1, the eNB 200 transmits, as the transmission timing information, dedicated information in accordance with the propagation delay, to each UE 100.

The eNB 200 calculates, similarly to operation pattern 1, the wait time in each UE 100, under consideration of the propagation delay (time) between the eNB 200 and each UE 100 of the plurality of UEs 100. For example, the eNB 200 calculates the wait time based on the TA value of each UE 100. Specifically, as illustrated in FIG. 8, the eNB 200 calculates the wait time by subtracting two TA values from the time after the eNB 200 completes the transmission of the data (the first information) until the eNB 200 receives the ACK (the second information). The eNB 200 may calculate the wait time from the propagation delay (time) calculated similarly as in operation pattern 1, instead of the TA value.

If a downlink transmission interval is prescribed in a frame configuration, the eNB 200 may shorten a time length of the data (first information) more than a predetermined value, as illustrated in FIG. 8. The predetermined value is a value indicating a transmission interval. In the present embodiment, the predetermined value is a frame length (time length) of a frame constituting the downlink transmission interval. As illustrated in FIG. 9, the eNB 200 may shorten the time length of the data more than the predetermined value by making a total time length of a part of the frame including the first information and the noise information, equal to a frame length F. Specifically, the eNB 200 may generate a radio signal including the first information from a start of the frame until halfway through the frame and including noise information at an end part of the frame. The data (the first information) may include a control domain (PDCCH (Physical Downlink Control Channel)/PHICH (Physical Hybrid-ARQ Indicator Channel)/PCFICH (Physical Control Format Indicator Channel)) and a data domain (PDSCH (Physical Downlink Shard Channel)). The noise information is any information (a radio signal) for preventing interruption for transmission by another communication device. The noise information is preferably a radio signal not including information necessary for the downlink transmission and/or the next uplink transmission in each UE 100 for which transmission of the second information is planned. A time length of the noise information may be prescribed in advance and may be adjusted by the eNB 200. For example, the eNB 200 may adjust the time length of the noise information based on a cell radius (that is, transmission power) in the unlicensed band. Accordingly, the eNB 200 may adjust the time length of the data. The eNB 200 may only shorten the time length of the data, that is, the eNB 200 may only transmit a radio signal corresponding to the data during a time shorter than a prescribed transmission time (the frame length F). In other words, the eNB 200 may not transmit a radio signal corresponding to the noise information, after transmitting the radio signal corresponding to the data.

It is noted that a DwPTS (Downlink Pilot Time Slot) in TTD (Time-Division Duplex) in LTE may be re-utilized for a transport block size (TBS). Alternatively, the TBS size may be newly prescribed. As a transmission format in the uplink, a prescription similar to the existing LTE (for example, an OFDM symbol, a subframe, or the like) may be used. Alternatively, the transmission format may be newly prescribed.

The eNB 200 may shorten the time length of the first information more than the predetermined value, based on the shortest wait time (SIFS time) from the reception of the first information to the transmission of the second information by each UE 100. For example, if the wait time from reception of the first information of normal time length to the transmission of the second information by the UE 100 is shorter than the SIFS time, the eNB 200 can shorten the time length of the first information more than the predetermined value.

The eNB 200 may shorten the time length of the first information more than the predetermined value, based on information in accordance with the propagation delay (time) between the eNB 200 and each UE 100. The information in accordance with the propagation delay (time) is, for example, information utilized for calculating the above-mentioned propagation delay time. For example, if a two-way propagation delay time is longer than the SIFS time, the eNB 200 can shorten the time length of the first information more than the predetermined value. It is noted that the eNB 200 may shorten the time length of the first information more than the predetermined value, based on both the propagation delay (time) and the SIFS time.

It is noted that, if transmitting dedicated first information to each UE 100, the eNB 200 may shorten the time length of the first information more than the predetermined value for the UE 100 in which the wait time is shorter than the SIFS time; and the time length of the first information for the other UE 100 may be as usual.

If shortening the time length of the first information, the eNB 200 may transmit information for designating the time length of the first information (a Data length L), to each UE 100. The information may be information indicating the Data length L. The information may be a time length of the noise information (a noise length N). If the downlink transmission interval is not prescribed in the frame configuration, the information may be information indicating each of the noise length N and the frame length F. It should be noted that, if the eNB 200 shortens the time length of the first information, the wait time is not a time from the reception completion of the information (the radio signal) corresponding to the noise information of the first information (control) to the transmission start of the second information.

After calculating the wait time in accordance with the propagation delay (time) of each UE 100, the eNB 200 transmits the calculated wait time as the transmission timing information to each UE 100. If including the transmission timing information in the first information, the eNB 200 may include the transmission timing information in the control domain. If including the transmission timing information in the first information, the eNB 200 may include the transmission timing information in a user data domain.

Each UE 100 having received the first information from the eNB 200 transmits the second information, based on the transmission timing information. Specifically, after completing the reception of the first information, each UE 100 starts transmission of the second information at a timing when the wait time indicated by the transmission timing information has elapsed.

The UE 100 may determine that the reception of the first information is completed, based on the information for designating the time length of the first information. If acquisition (monitoring) of the radio signal corresponding to the first information is not possible any more, the UE 100 may determine that the reception of the first information is completed. If information indicating an end of the first information is attached at the end of the first information, the UE 100 may determine that the reception of the first information is completed, based on the information.

(C) Operation Pattern 3

In operation pattern 3, the eNB 200 transmits, as the transmission timing information, information indicating a reception start timing of the second information in the eNB 200. That is, in operation pattern 3, the eNB 200 transmits, to each UE 100, information common to each UE 100, as the transmission timing information.

The eNB 200 determines the reception start timing (reception timing) of the (desired) second information. The eNB 200 may determine the reception start timing of the second information under consideration of the transmission timing of the first information. Further, after determining the reception start timing of the second information, the eNB 200 may, similarly to operation pattern 2, shorten the time length of the first information more than the predetermined value.

The eNB 200 transmits, as the transmission timing information, information indicating the reception start timing of the second information in the eNB 200, to each UE 100. Specifically, the eNB 200 transmits, to each UE 100, information indicating the reception start timing of the second information, based on the UTC. The information indicating the reception start timing of the second information may be information indicating a radio resource used by the eNB 200 for receiving the second information (especially information for designating a time location (and a frequency location)).

It is noted that, if using a channel in the licensed band to transmit the transmission timing information, the eNB 200 may transmit the transmission timing information by a common signaling (for example, SIB (System Information Block), PDCCH, or the like).

Each UE 100 designates the transmission timing of the second information, based on the transmission timing information. For example, the UE 100-1 calculates the transmission timing of the second information in the UE 100-1, based on information in accordance with the propagation delay between the eNB 200 and the UE 100-1 and information indicating the reception start timing of the second information in the eNB 200. Specifically, the UE 100-1 calculates, as the transmission timing, a timing earlier, by the propagation delay time (for example, the TA value), than the reception start timing of the second information in the eNB 200.

It is noted that the UE 100-1 may regard information other than the TA value as the propagation delay time. For example, the UE 100-1 may calculate the propagation delay time based on a difference between a time stamp indicating a transmission timing included in a radio signal received from the eNB 200 via the WLAN communication scheme in the unlicensed band and a timing when the UE 100 receives the radio signal. Alternatively, the UE 100-1 may calculate the propagation delay time based on the location information of the eNB 200 and the location information of the UE 100. The UE 100-1 may acquire the location information of the eNB 200 from the eNB 200. Information for calculating the propagation delay time may be transmitted from the eNB 200 to the UE 100-1, together with the transmission timing information.

After designating the transmission timing of the second information, each UE 100 performs transmission of the second information at the designated transmission timing.

(D) Operation Pattern 4

In operation pattern 4, the eNB 200 transmits, as the transmission timing information, information indicating a time from the transmission completion of the first information in the eNB 200 to the reception start of the second information. That is, in operation pattern 4, the eNB 200 transmits, to each UE 100, information common to each UE 100, as the transmission timing information.

The eNB 200 determines the reception start timing (reception timing) of the (desired) second information. The eNB 200 may determine the reception start timing of the second information under consideration of the transmission timing of the first information. After determining the reception start timing of the second information, the eNB 200 may, similarly to operation pattern 2, shorten the time length of the first information more than the predetermined value.

In this manner, the eNB 200 calculates a time (hereinafter, eNB wait time) from the transmission completion of the first information to the reception start of the second information, by determining the transmission completion timing of the first information and the reception start timing of the second information. The eNB 200 transmits the calculated eNB wait time, as the transmission timing information, to each UE 100.

Each UE 100 designates the transmission timing of the second information, based on the transmission timing information. For example, the UE 100-1 calculates the transmission timing of the second information in the UE 100-1, based on information in accordance with the propagation delay between the eNB 200 and the UE 100-1 and information indicating the eNB wait time. Specifically, the UE 100-1 can calculate the wait time by subtracting two TA values from the eNB wait time. Similarly to operation pattern 3, the wait time may be calculated from information other than the TA value.

After calculating the wait time, each UE 100 transmits, similarly to operation pattern 2, the second information to the eNB 200.

(E) Operation Pattern 5

In operation pattern 5, the eNB 200 transmits, as the transmission timing information, information for designating a time length of the first information that is shorter than a predetermined value. That is, in operation pattern 5, the eNB 200 transmits, to each UE 100, information common to each UE 100, as the transmission timing information.

As illustrated in FIG. 10, after completing transmission of the first information of the prescribed frame length F, the eNB 200 regards a timing immediately after the SIFS time has elapsed, as the reception start timing of the second information.

Under consideration of the propagation delay time, the eNB 200 shortens the time length of the first information more than the predetermined value, so that, even if the UE 100 with the longest propagation delay time transmits the second information after the SIFS time has elapsed since the reception completion of the first information, the eNB 200 can receive the second information until the reception start timing of the second information.

The eNB 200 transmits, as the transmission timing information, information for designating the time length of the first information (the Data length L) to each UE 100. Information for designating the time length of the first information (the Data length L) is information similar as in operation pattern 2.

Each UE 100 designates the wait time, based on the transmission timing information. Specifically, as illustrated in FIG. 10, the wait time is the sum of the SIFS time and an adaptation time. The adaptation time corresponds to a value obtained from subtracting two TA values from the Data length L. Each UE 100 starts, similarly to operation pattern 2, transmission of the second information at a timing when the calculated (designated) wait time has elapsed.

SUMMARY

In the present embodiment, the eNB 200 transmits, to each UE 100, the transmission timing information for each UE 100 to designate the transmission timing of the second information. Each UE 100 receives the transmission timing information from the eNB 200. Based on the transmission timing information, each UE 100 can calculate (designate) the transmission timing of the second information and transmit the second information at the timing. As a result, the eNB 200 can control the transmission timing of the second information. Therefore, the eNB 200 can receive the second information from the plurality of UEs 100 at the same timing or within the same radio resource in the time direction, without the second information dispersing in the time direction, even if, for example, receiving the second information from each UE 100 as a response to the reception of the first information transmitted in the same radio resource. The second information does not disperse in the time direction, and thus, the eNB 200 can grasp the reception timing of the second information from each UE 100 and can suitably demultiplex the second information.

Further, a data amount of feedback information such as the ACK/NACK is small, and thus, the eNB 200 receives the feedback information as the first information at the same time (and the same frequency), whereby the radio resource can be effectively exploited.

Thus, the eNB 200 can efficiently receive the second information from the plurality of UEs 100.

Second Embodiment

Figure 11:
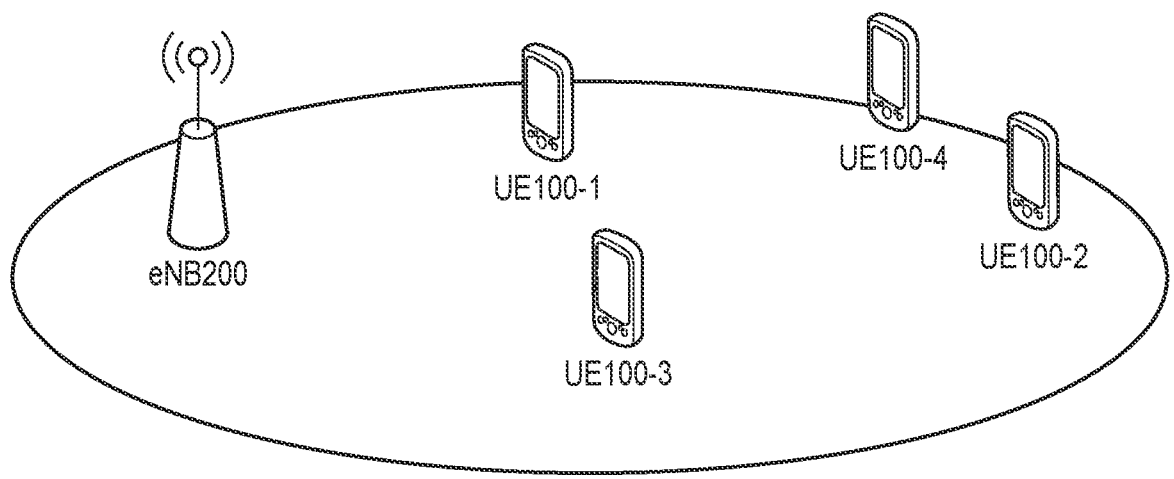
FIG. 11 is a diagram for describing an operation according to a second embodiment.

Next, a second embodiment will be described by using FIG. 11. FIG. 11 is a diagram for describing an operation according to the second embodiment. Description of parts similar to those in the first embodiment will be omitted where appropriate.

As illustrated in FIG. 11, each UE 100 (a UE 100-1 to a UE 100-4) is located within a cell managed by the eNB 200. Here, the cell is a cell operated in the unlicensed band. Therefore, each UE 100 is in a state in which the UE 100 can receive a radio signal from the eNB. The UE 100-1 and the UE 100-3 are located close to the eNB 200, the UE 100-2 and the UE 100-4 are located far from the eNB 200.

If transmitting first information, the eNB 200 classifies a plurality of UEs 100 that are the reception target of the first information, into a plurality of groups, based on the propagation delay time. Specifically, the eNB 200 classifies, from the plurality of UEs 100, each UE 100 having a propagation delay time included in a predetermined range, into the same group. For example, the eNB 200 classifies each UE 100 into the same group, so that a difference between the maximum value and the minimum value of the TA value does not exceed a threshold value X. If the TA value of the UE 100-1 and the TA value of the UE 100-3 are included in the predetermined range, the eNB 200 classifies the UE 100-1 and the UE 100-3 into the same group. Accordingly, the difference between the TA value of the UE 100-1 and the TA value of the UE 100-3 does not exceed the threshold value X. Similarly, the eNB 200 classifies the UE 100-2 and the UE 100-4 into the same group. It is noted that the predetermined range and the threshold value X are values in accordance with a variance of an allowable reception timing.

The eNB 200 may classify the plurality of UEs 100 into the plurality of groups, based on information in accordance with a propagation delay other than the TA value (for example, location information and the like).

The eNB 200 performs scheduling so that each UE 100 constituting the same group is allocated with the same downlink radio resource. Afterwards, the eNB 200 transmits the first information to each UE 100, based on the scheduling. Specifically, the eNB 200 uses the same radio resource (a first radio resource) to simultaneously transmit the first information to the UE 100-1 and the UE 100-3, via the WLAN communication scheme. On the other hand, the eNB 200 uses a radio resource different from the first radio resource in the time direction, to simultaneously transmit the first information to the UE 100-2 and the UE 100-4, via the WLAN communication scheme.

After receiving the first information, each UE 100 transmits second information to the eNB 200, after the SIFS time has elapsed. The UE 100-1 and the UE 100-3 receive the first information substantially simultaneously and transmit the second information substantially simultaneously. Furthermore, the UE 100-2 and the UE 100-4 receive the first information substantially simultaneously and transmit the second information substantially simultaneously.

The eNB 200 receives the second information substantially simultaneously from the UE 100-1 and the UE 100-3, and receives the second information substantially simultaneously from the UE 100-2 and the UE 100-4.

Thus, the eNB 200 can adjust a timing when the eNB 200 receives the second information, by transmitting the first information to each group based on the propagation delay time. Therefore, the eNB 200 can receive the second information, from each UE 100 constituting the same group, at the same timing or within the same radio resource in the time direction, without the second information dispersing in the time direction. Thus, the eNB 200 can efficiently receive the second information from the plurality of UEs 100.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In each of the above-described embodiments, the second information may not only be the ACK/NACK, but may be control information and/or user data information (for example, PUCCH (Physical Uplink Control CHannel)/PUSCH (Physical Uplink Shared CHannel)).

In each of the above-described embodiments, communication via the WLAN communication scheme between the UE 100 and the eNB 200 is described, but this is not limiting. The above-described operation can also be executed in a communication via a WLAN communication scheme between UEs 100.

An operation according to the above-described first embodiment may be executed, for example, in a case that UEs 100 being allocated with the same radio resource transmit feedback information (ACK/NACK) by using the same radio resource, via MU-MIMO (Multi User MIMO) technology.

Figure 12:
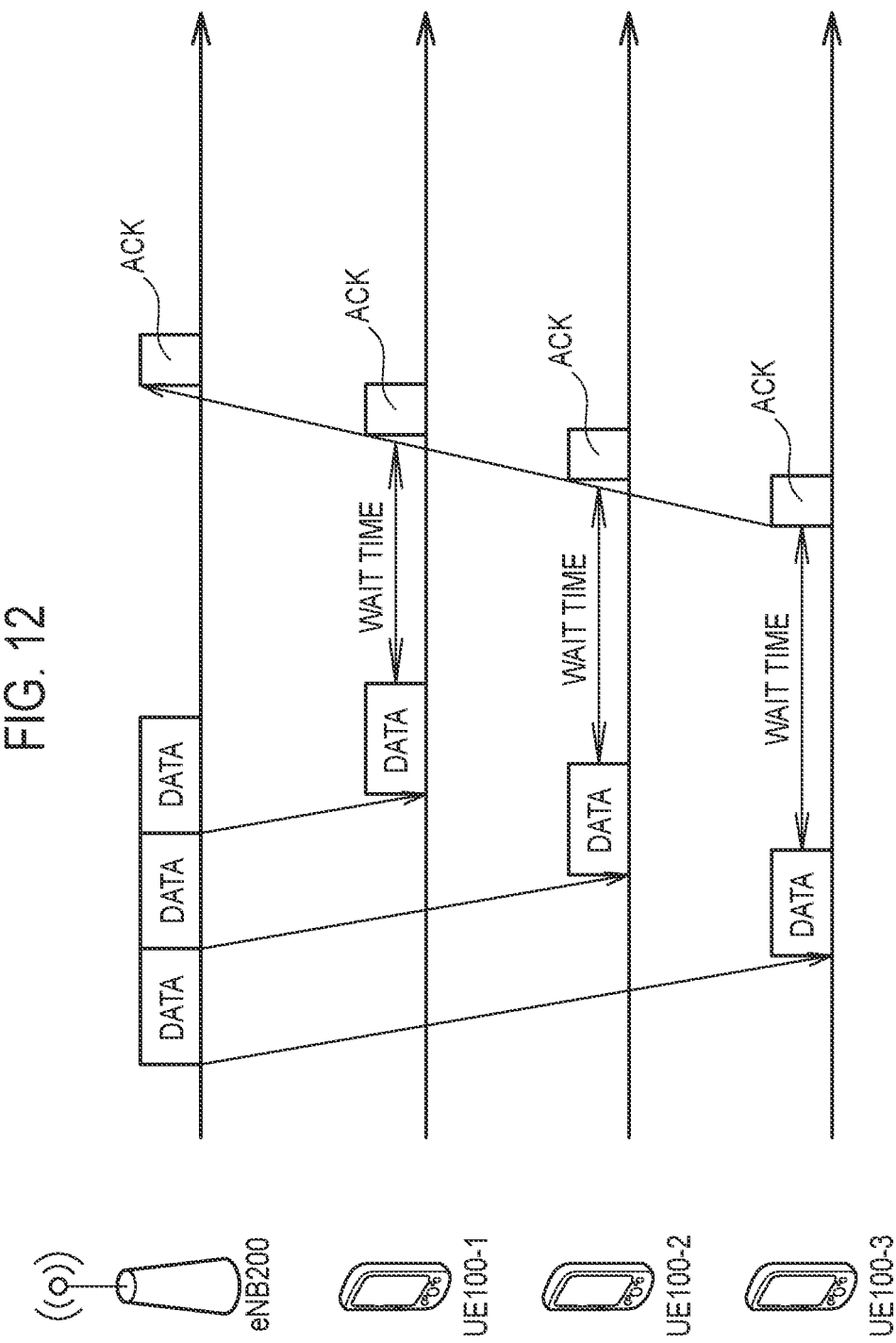
FIG. 12 is a diagram for describing an operation according to other embodiments.

Further, the operation of the first embodiment may not only be executed in the case that the eNB 200 transmits the first information at the same timing or by using the same radio resource in the time direction (and frequency direction), but also, as illustrated in FIG. 12, in a case that the eNB 200 transmits the first information (the data) at a timing different in the time direction. For example, feedback information (ACK/NACK) for a burst transmission may be transmitted from the UE 100 to the eNB 200 at the same timing or by using the same radio resource in the time direction (and frequency direction).

In operation pattern 2 of the above-described first embodiment, the eNB 200 transmits, as the transmission timing information, the wait time from the reception completion of the first information to the transmission start of the second information, to each UE 100. However, the wait time may also be a wait time from the reception start of the first information to the transmission start of the second information. In this case, each UE 100 starts transmission of the second information at the timing when the wait time has elapsed since starting the reception of the first information from the eNB 200.

Further, the above-described wait time includes the SIFS time, however, the wait time may not include the SIFS time. Accordingly, the eNB 200 may transmit, as the transmission timing information, a wait time not including the SIFS time, to each UE 100. In this case, each UE 100 starts transmission of the second information at the timing when the wait time received from the eNB 200 and the SIFS time have elapsed since completing the reception of the first information.

In operation pattern 2 of the above-described first embodiment, a case is described in detail in which the eNB 200 shortens the time length of the first information more than the predetermined value, but needless to say, a similar operation can be executed in another operation pattern.

The operation according to each of the above-described embodiments may be combined to be executed, where necessary. For example, the eNB 200 may transmit all transmission timing information in each operation pattern of the above-described first embodiment or a plurality of items of transmission timing information, to the UE 100.

Although not particularly mentioned in each of the above-described embodiments, a program for causing a computer to execute each process performed by any one of the above-described nodes (such as the UE 100 and the eNB 200) may be provided. Further, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor for executing the program stored in the memory.

In each of the above-described embodiments, an LTE system is described as an example of the mobile communication system; however, the LTE system is not an exclusive example, and the content according to the present application may be applied to a system other than the LTE system.

INDUSTRIAL APPLICABILITY

The present invention is useful in the field of radio communication.

The invention claimed is:

1. A base station, comprising:
   a transmitter configured to transmit first information to a plurality of user devices, via a communication scheme in which communication is performed without synchronization between devices;
   a receiver configured to receive second information as a response to reception of the first information from the plurality of user devices via the communication scheme; and
   a controller, wherein
   the transmitter is configured to transmit, to each of the plurality of user devices, transmission timing information for each of the plurality of user devices to designate a transmission timing of the second information,
   the transmitter is configured to transmit, as the transmission timing information, dedicated information determined by the base station in accordance with a propagation delay between the base station and each user device,
   the propagation delay for each user device is a difference between a transmission timing of a radio signal by that user device and a reception timing of the radio signal by the base station, and
   the controller is configured to adjust a time length of the first information based on the propagation delay for each user device.

2. The base station according to claim 1, wherein
   the dedicated information indicates a wait time from a reception completion of the first information to a transmission start of the second information.

3. The base station according to claim 1, wherein
   the transmitter is configured to transmit, as the transmission timing information, to each of the plurality of user devices, common information for the plurality of user devices to designate a reception timing of the second information in the base station.

4. The base station according to claim 3, wherein
   the common information is at least one of:
   information indicating a reception start timing of the second information in the base station; and
   information indicating a time from a transmission completion of the first information to a reception start of the second information in the base station.

5. The base station according to claim 1, wherein
   the controller is configured to adjust the time length of the first information to a value shorter than a predetermined value indicating a prescribed downlink frame length, based on the propagation delay.

6. The base station according to claim 5, wherein
   the controller is configured to adjust the time length of the first information when a time determined based on the propagation delay is longer than a Short InterFrame Space (SIFS) time.

7. The base station according to claim 1, wherein
   the transmitter is configured to transmit, as the transmission timing information, information for designating the adjusted time length of the first information, to each of the plurality of user devices.

8. A user device, comprising:
   a receiver configured to receive first information from a base station, via a communication scheme in which communication is performed without synchronization between devices; and
   a transmitter configured to transmit, in response to reception of the first information, second information to the base station, via the communication scheme, wherein
   the receiver is configured to receive, from the base station, transmission timing information for the user device to designate a transmission timing of the second information,
   the receiver is configured to receive, as the transmission timing information, dedicated information determined by the base station in accordance with a propagation delay between the user device and the base station,
   the propagation delay for the user device is a difference between a transmission timing of a radio signal by the user device and a reception timing of the radio signal by the base station, and
   a time length of the first information is adjusted by the base station based on the propagation delay for the user device.

9. The user device according to claim 8, wherein
   the dedicated information indicates a wait time from a reception completion of the first information to a transmission start of the second information.

10. The user device according to claim 8, further comprising:
    a controller configured to designate a transmission timing of the second information, based on the transmission timing information, wherein
    the receiver is configured to receive, as the transmission timing information, common information for designating a reception timing of the second information in the base station, from the base station.

11. The user device according to claim 10, wherein
    the common information for designating the reception timing of the second information in the base station is at least one of:
    information indicating a reception start timing of the second information in the base station, and
    information indicating a time from a transmission completion of the first information to a reception start of the second information in the base station.

12. The user device according to claim 8, further comprising:
    a controller configured to designate a transmission timing of the second information, based on the transmission timing information, wherein
    the receiver is configured to receive, as the transmission timing information, information for designating the adjusted time length of the first information.

13. A base station, comprising:
    a controller configured to classify a plurality of user devices being a reception target for receiving first information via a communication scheme in which communication is performed without synchronization between devices, into a plurality of groups;
    a transmitter configured to simultaneously transmit the first information to each of a plurality of user devices constituting a same group among the plurality of user devices, via the communication scheme; and
    a receiver configured to receive second information as a response to reception of the first information from each of the plurality of user devices, via the communication scheme, wherein
    the controller is configured to classify the plurality of user devices into the plurality of groups based on a propagation delay between the base station and each of the plurality of user devices,
    the propagation delay for each user device is a difference between a transmission timing of a radio signal by that user device and a reception timing of the radio signal by the base station, and the controller is configured to classify, among the plurality of user devices, each of the plurality of user devices having a propagation delay included in a predetermined range, into a same group.

* * * * *